United States Patent Office 2,900,348
Patented Aug. 18, 1959

2,900,348

PREPARATION OF SILICA SOLS

Jacob Elston Ahlberg and Edgar A. Simpson, Baltimore, Md., assignors to W. R. Grace & Co., New York, N.Y., a corporation of Connecticut No Drawing. Application February 2, 1954
Serial No. 407,797

4 Claims. (Cl. 252—313)

This invention relates to silica sols and more particularly to a method of preparing stable sols of high silica concentration. Silica sols comprise very finely divided discrete particles of partially hydrated silica in water. These sols find particular application as anti-slip agents in floor wax, anti-slip and anti-static agents for textiles, as pre-coats for sensitized papers, and as fillers for latex rubber.

The preparation of silica hydrosols by reversion of acid set silica hydrogels has been described in Neundlinger Patent No. 1,835,420 (1931). According to the patent purified silica hydrogel containing 7%–15% $SiO_2$ is treated with a small proportion of ammonia, for example, as by soaking the gel in a 0.5%–1.0% ammonia solution, or by direct treatment of the gel with ammonia gas. The thus treated gel is then heated in a closed vessel for a period of 24–48 hours at 100° C. which converts the gel to a liquid sol of the same $SiO_2$ content.

According to a well-known current method, a silica hydrogel having a pH between 1.5 and 7 is prepared by neutralizing an alkali metal silicate with acid. The gel is washed with water to remove electrolytes formed during the reaction, and is then covered with a solution of a substance capable of forming hydroxyl ions. After removal from the hydroxyl ion solution, the hydrogel is heated in an autoclave or other closed vessel at between 80° C. and 200° C. or higher until substantially all of the gel is converted to a hydrosol. Following heating, the hydrosol is filtered to remove any undispersed hydrogel. Thus, while this method successfully causes reversion of the hydrogel, the reversion or peptization step is not particularly efficient, and under certain conditions within the above temperature range considerable hydrogel remains undissolved.

By way of illustration, acid set hydrogels of high $SiO_2$ content and pH about 1.5, and of low $SiO_2$ content and pH of about 7 prepared in accordance with the latter method when washed, treated with varying amounts of hydroxyl ions and heated wtihin the temperature limits above specified consistently fail to completely revert to silica hydrosol. In these cases about ⅓ of the hydrogel is left in the bomb in the form of hard, dense agglomerates. Furthermore, the hydrosols prepared by this method are quite cloudy, contain relatively large micelles of silica, and when concentrated tend to settle to a marked extent upon prolonged standing.

Accordingly, it is a primary object of the present invention to prepare silica sols of high concentration. A further object of the invention is to prepare from silica hydrosols stable concentrated silica sols of low viscosity which will not gel with the passage of time.

We have discovered a new method for preparing stable silica sols of high concentration which do not exhibit any appreciable increase in viscosity with age. Briefly, the method comprises the steps of peptizing a silica hydrogel, further heat treating the resultant silica hydrosol to dehydrate and stabilize the silica micelles, thereby forming a silica sol, and finally concentrating said sol.

Before describing the present invention in detail, however, it is to be understood that silica hydrosol as employed herein refers to the material resulting from the peptization of silica hydrogel and is to be distinguished from silica sol which is used herein to denote the product resulting from further heat treatment of the hydrosol. The terms alkaline set hydrogel or alkaline hydrogel are employed herein to describe hydrogels prepared by reacting an alkali metal silicate with less than the stoichiometric quantity of acid required to react with all of the alkali present in the silicate. The alkali content of the silicate must of course first be determined in order that the acid requirement may be ascertained. Acid-set hydrogels describe those hydrogels prepared by the addition to sodium silicate of more than the stoichiometric equivalent of acid.

The method of the present invention comprises first preparing silica hydrogel by commingling an alkali metal silicate with a mineral or an organic acid or mixture thereof, allowing the resulting hydrogel to synerize and then removing the hydrogel from the syneresis liquid. The hydrogel is then broken up and extensively washed with deionized water to remove soluble salts. The pH of the washed hydrogel is adjusted to 9–9.5, if not already within this range, and the hydrogel placed in a covered container or reflux apparatus to prevent evaporation of water and is slowly heated to 95°–100° C. and maintained at this temperature for from 8 to 18 hours. This effects complete conversion of the hydrogel to silica hydrosol. The resulting hydrosol is then heated in an autoclave, or other closed vessel to prevent evaporation, at a relatively constant temperature within the range 160° C. to 210° C. for 45–90 minutes to stabilize the hydrosol against particle growth and/or gelation. The dilute sol is then concentrated.

An alkaline silica hydrogel is prepared by incompletely neutralizing an alkali metal silicate solution, preferably sodium silicate, by the addition of an acid thereto. The amount of acid used corresponds to between about 70% and 95% of that stoichiometrically required to neutralize the total $Na_2O$, or equivalent alkali, present in the silicate solution. Sulfuric acid is preferred because of its favorable economic position. The concentration of the silicate solution is adjusted so as to form a hydrogel of between about 4% and 9% $SiO_2$.

Following syneresis, the hydrogel is thoroughly washed with deionized water until substantially free of soluble salts. A deionized water wash is essential to the formation of stable sols from alkaline hydrogels. Tap water is unsatisfactory since the multivalent cations always present therein replace zeolitic soda in the hydrogel and are retained as an impurity in the subsequently prepared hydrosol. These multivalent cations cause an increase in micelle size and in some instances cause gelation during the further heat treatment or concentration of the resulting silica sol. For this reason their presence in the hydrogel is to be avoided.

In the case of hydrogel prepared by 70% neutralization of a sodium silicate solution with sulfuric acid, washing to the necessary sulfate level, which is the point at which the effluent does not cause precipitation of barium sulfate from a barium chloride solution, reduces pH from the range 10–10.5 to 9–9.5. However, a hydrogel prepared by neutralizing about 95% of the sodium silicate when washed exhibits a pH of about 7.5. In this case, the pH of the hydrogel is adjusted to 9.0–9.5 by the addition of a suitable quantity of NaOH, $NH_4OH$ or both prior to peptization. Alkaline set hydrogels require about 40 hours and acid set about 16 hours washing to arrive at the specified sulfate level.

The washed hydrogel of about 4%–9% $SiO_2$ and pH between 9 and 9.5 is slowly heated in either a closed container or reflux apparatus to 95°–100° C., and heating is continued at this temperature to peptize the hydrogel to silica hydrosol. A slow warm-up to peptization temperature, requiring about 6 hours, is essential to maximum conversion to the hydrosol. Proper warm-up may be effected by maintaining the hydrogel at about 70° C. for 6 hours. From 8 to 18 hours, usually about 10 hours, at 95°–100° C. is then necessary to effect complete reversion. With slow warm-up conversions are consistently between 98% and 100% complete. However, with fast warm-up localized overheating cannot be avoided and only about 80% of the hydrogel is peptized. The pH of the hydrosol is slightly greater than that of the hydrogel, while the $SiO_2$ content is the same. If below a pH of 9.2 the hydrosol is adjusted to pH 9.3–9.6 before subsequent additional heat treatment.

The hydrosol is now subjected to additional heat treatment at substantially higher temperatures. This step, referred to herein as autoclaving, comprises maintaining the hydrosol under non-evaporative conditions at a substantially constant temperature within the range 160° to 210° C. for a period of about 45–90 minutes, preferably about 60 minutes. This treatment stabilizes the silica micelles against further growth, thus forming a silica sol which may be easily concentrated to at least 30% $SiO_2$ without gelation. The additional heat treatment may be carried out in a stationary autoclave or other sealed vessel or by pumping the hydrosol through a continuous pipe autoclave.

The sol product from the autoclave treatment exhibits a pH of about 9.5–9.7 and is concentrated by vacuum evaporation, or by other methods which will avoid localized overheating, to above 30% $SiO_2$.

Although the present invention has been described as applicable to alkaline set silica hydrogels, it is not limited thereto. Certain acid set silica hydrogels are entirely satisfactory as starting materials, namely, those prepared by the reaction between sodium silicate and an acid wherein the acid is present in amounts up to about 10% more than is stoichiometrically required to neutralize the alkali present in the sodium silicate solution. When 10% excess sulfuric acid is employed, the pH of the resulting silica hydrogel is about 4 to 5. Following washing with deionized water this hydrogel is treated with dilute NaOH or $NH_4OH$ to raise its pH to 9.0–9.5 prior to peptization.

Autoclaving the silica hydrosol at temperatures within the recited range, 160°–210° C., produces a product which may be concentrated without gelation and which does not tend to become more viscous upon aging. However, hydrosols autoclaved below 160° C., at 150° C., for example, become more viscous with age and in many instances gel within a few weeks. The increase in viscosity or instability of such sols is due to the fact that micelle growth is not satisfactorily arrested by treatment at temperatures below 160° C.

Within the recited temperature range, viz., 160°–210° C., hydrosols autoclaved at 180° C. yield sols which appear to have the smallest micelle size. This is evidenced by microscopic examination and by the fact that such sols when concentrated to about 30% $SiO_2$ are transparent, or translucent bluish grey, while sols prepared by autoclaving at 210° C. are opaque white. The latter sols are also somewhat more viscous. Because of the differences in physical characteristics of the products prepared at 180° C. and 210° C., the temperature during autoclaving should remain constant.

Furthermore, we have discovered that the silica micelle size in the sol produced from a given hydrosol may be controlled by varying the concentration of said hydrosol prior to autoclaving. This is illustrated in Table I which shows viscosities, relative to water, of sols at concentrations of 30% $SiO_2$ prepared from one hydrosol of varied concentration. The original hydrosol contained 5.75% $SiO_2$ and was prepared according to the method described herein from a hydrogel which exhibited a pH of 10.1 prior to washing. The remaining three hydrosols were prepared by concentrating and diluting the original hydrosol. All four hydrosols were autoclaved at 200° C. according to the present invention and concentrated to above 30% $SiO_2$, diluted, and relative viscosity determined at 30% $SiO_2$.

TABLE 1

| Concentration of Hydrosol ($SiO_2$) | Relative Viscosity of Silica Sols (Water=1.00) | | |
|---|---|---|---|
| | Not Autoclaved | Autoclaved | Concentrated to 30% |
| 2.85% | 1.45 | 1.07 | 2.88 |
| 5.75% | 2.90 | 1.12 | 3.06 |
| 11.02% | 12.0 | 1.29 | 3.46 |
| 16.44% | 203.00 | 1.70 | 19.60 |

The method of the present invention is further illustrated by the following non-limiting examples.

*Example I*

An alkaline set silica hydrogel was prepared by adding 1 liter of 29.7% sulfuric acid to 2280 ml. of 40° Bé. sodium silicate diluted to 12 liters (3.25 $SiO_2$ to 1 $Na_2O$). Within 2 minutes the mixture had set to a hydrogel which contained 6.4% $SiO_2$ and had a pH of 10.0–10.5. The hydrogel was allowed to synerize for 6 hours and then removed from the syneresis liquid and washed with deionized water for 40 hours at a rate of 3–4 gallons per hour. After washing the pH of the hydrogel was 9.0–9.2. The hydrogel product, which weighed about 30 pounds, was placed in a covered container and heated in an oven for a period of 16 hours, the first 6 hours at 70° C.–80° C. to gradually warm up the hydrogel, after which the material was brought to 95° C.–100° C. and maintained there for 10 hours. Upon examination, the hydrogel was observed to have been completely converted to silica hydrosol, and no residue remained in the container. The hydrosol was then further heat treated by pumping it through a continuous autoclave at a rate of 500 ml./hr., which permitted a residence time of 1 hour at a temperature of 180° C. The pH of the autoclaved sol was 9.5–9.6. Four samples were taken from the product and each was concentrated by vacuum evaporation to a different $SiO_2$ content between 28% and 40%. The concentrated sols were transparent bluish grey. Table 2 presents the viscosity of each sample relative to water as determined with an Ostwald viscosity pipette.

TABLE 2

| Sample No. | Concentration Percent $SiO_2$ | Relative Viscosity (water—1.0) |
|---|---|---|
| 1 | 28 | 2.8 |
| 2 | 30 | 3.0 |
| 3 | 35 | 4.8 |
| 4 | 40 | 8.6 |

*Example II*

A silica hydrogel similar in all respects to that of Example I was washed and peptized at 100° C. for 16 hours as in Example I, but instead of slowly warming the hydrogel to 100° C., the material was rapidly brought to 100° C. by use of an electric mantle. At the end of 16 hours, only about 80% of the hydrogel had been converted to silica hydrosol, which had a pH of 9.0. After separating the hydrogel residue, the hydrosol was autoclaved in accordance with Example I, and the sol product, pH 10.6, concentrated to 28% $SiO_2$. The product had a viscosity relative to water of 90, and became quite syrupy after several weeks.

In order to further illustrate the improved yields of silica sol attainable by the two step or peptization-high temperature autoclaving method of this invention over a well known prior art method, the following test was made.

*Example III*

An acid set hydrogel containing 11% $SiO_2$ was washed with deionized water until sulfate free, diluted with water to 4% $SiO_2$, and then treated with NaOH to give a silica to soda ratio of 100:1. The thus treated material was divided, and one portion ground in a Waring blender while the other was ground in a colloid mill. A slurry of each portion without preliminary warm up was pumped through a continuous autoclave at a rate of 500 ml./hr., giving a residence time of 1 hour, at a temperature of 200° C. In both cases peptization was incomplete, with about ⅓ of the silica remaining in the autoclave in the form of hard, white, dense agglomerates. The products were white translucent fluid hydrosols which partially settled upon standing. Further settling occurred during concentration by evaporation under vacuum.

*Example IV*

An acid set silica hydrogel was prepared by adding to a sodium silicate solution containing 9.1% $SiO_2$ and 2.8% $Na_2O$ sufficient 30% sulfuric acid solution so as to have a 10% excess of acid in the mixture over that required to completely neutralize the silicate solution. A silica hydrogel having a pH of 5.0 and a $SiO_2$ content of 8.0% set in two minutes, and was allowed to synerize. The gel was then removed from its syneresis liquid and washed with deionized water at a rate of 3 gallons per hour for 24 hours. The washed gel was then divided into two parts, one soaked in a 1.5% NaOH solution and the other soaked in a 1.5% $NH_4OH$ solution for 24 hours. Excess solution was drained from the two samples now having pH's between 9.0 and 9.5, and both were gradually heated in covered containers to 70° C. and maintained at that temperature for 8 hours. The temperature was then raised to 98° C. and maintained there for 24 hours. The degree of peptization to the hydrosol in both cases was 99% complete.

These particular samples were not subjected to autoclaving and concentration since experience had demonstrated that a hydrogel which peptizes virtually completely may subsequently be successfully densified in the autoclave and then concentrated to above 30% $SiO_2$.

We claim:

1. A method of preparing a silica sol stable at silica concentrations up to 30% which comprises preparing an alkaline silica hydrogel by incompletely neutralizing an alkali metal silicate solution by commingling therewith less than the stoichiometric amount of acid required to neutralize the alkali in the silicate solution, washing said hydrogel with deionized water to remove soluble alkali metal salts, gradually raising the temperature of said hydrogel at a pH between 9 and 9.5 under non-evaporative conditions over a period of about 6 hours to 95°–100° C., maintaining the hydrogel at said temperature thereby converting between 98% and 100% of said hydrogel to silica hydrosol, further heat treating said hydrosol under non-evaporative conditions at a fixed temperature within the range 160°–210° C. for a period of 45–90 minutes to stabilize the micelles of the colloid against further growth, and concentrating the sol.

2. A method of preparing a concentrated, stable silica sol which comprises preparing an alkaline silica hydrogel by incompletely neutralizing an alkali metal silicate solution by the addition thereto of between 70% and 95% of the acid required to react with all of the alkali present in the silicate, washing said hydrogel with deionized water to remove soluble alkali metal salts, gradually raising the temperature of said hydrogel at a pH between 9 and 9.5 under non-evaporative conditions over a period of about 6 hours to 95°–100° C. and maintaining the hydrogel at said temperature for a period of 10–18 hours to convert between 98% and 100% of said hydrogel to silica hydrosol, further heat treating said hydrosol under non-evaporative conditions at a fixed temperature within the range 160°–210° C. for a period of 45–90 minutes to stabilize the silica micelles against further growth, and concentrating said sol to a silica content of 15–30%.

3. A method of preparing a silica sol of at least 30% $SiO_2$ which comprises preparing an alkaline set silica hydrogel containing between about 4 and 9 percent $SiO_2$ having a pH between about 9 and 10 by incompletely neutralizing an alkali metal silicate solution by the addition thereto of between 70% and 95% of the acid required to react with all of the alkali present in the silicate solution, washing said hydrogel with deionized water to remove soluble alkali metal salts, gradually raising the temperature of the hydrogel at a pH between 9 and 9.5 under non-evaporative conditions over a period of about 6 hours to 95°–100° C. and maintaining the hydrogel at said temperature for a period of 10–18 hours to convert between 98% and 100% of the hydrogel to silica hydrosol, further heat treating said hydrosol of a pH between 9.3 and 9.6 under non-evaporative condition at a constant temperature within the range 160°–210° C. for a period of about 60 minutes to stabilize the silica miscelles against further growth, and concentrating said sol.

4. A method of preparing a silica sol of at least 30% $SiO_2$ which comprises preparing an alkaline set silica hydrogel of a pH of 9–10 containing about 4–9 percent $SiO_2$ by incompletely neutralizing a sodium silicate solution by the addition thereto of between 70% and 95% of the sulfuric acid required to react with all of the soda present in the silicate solution, washing said hydrogel with deionized water to remove sodium sulfate, gradually raising the temperature of said hydrogel at a pH between 9 and 9.5 under non-evaporative conditions over a period of about 6 hours to 95°–100° C., and maintaining the hydrogel at said temperature for a period of 10–18 hours to convert between 98% and 100% of the hydrogel to silica hydrosol, further heat treating said hydrosol at a pH between 9.3 and 9.5 under non-evaporative conditions within the range 160°–210° C. for a period of about 60 minutes to stabilize the silica micelles against further growth, and concentrating said sol.

References Cited in the file of this patent

UNITED STATES PATENTS

| | | |
|---|---|---|
| 2,285,449 | Marshall | June 9, 1942 |
| 2,443,512 | Powers et al. | June 15, 1948 |
| 2,572,578 | Trail | Oct. 23, 1951 |
| 2,605,228 | Alexander et al. | July 29, 1952 |
| 2,724,701 | Legal | Nov. 22, 1955 |